(No Model.)
J. K. STEWART.
TOLL REGISTER.
No. 384,938. Patented June 19, 1888.
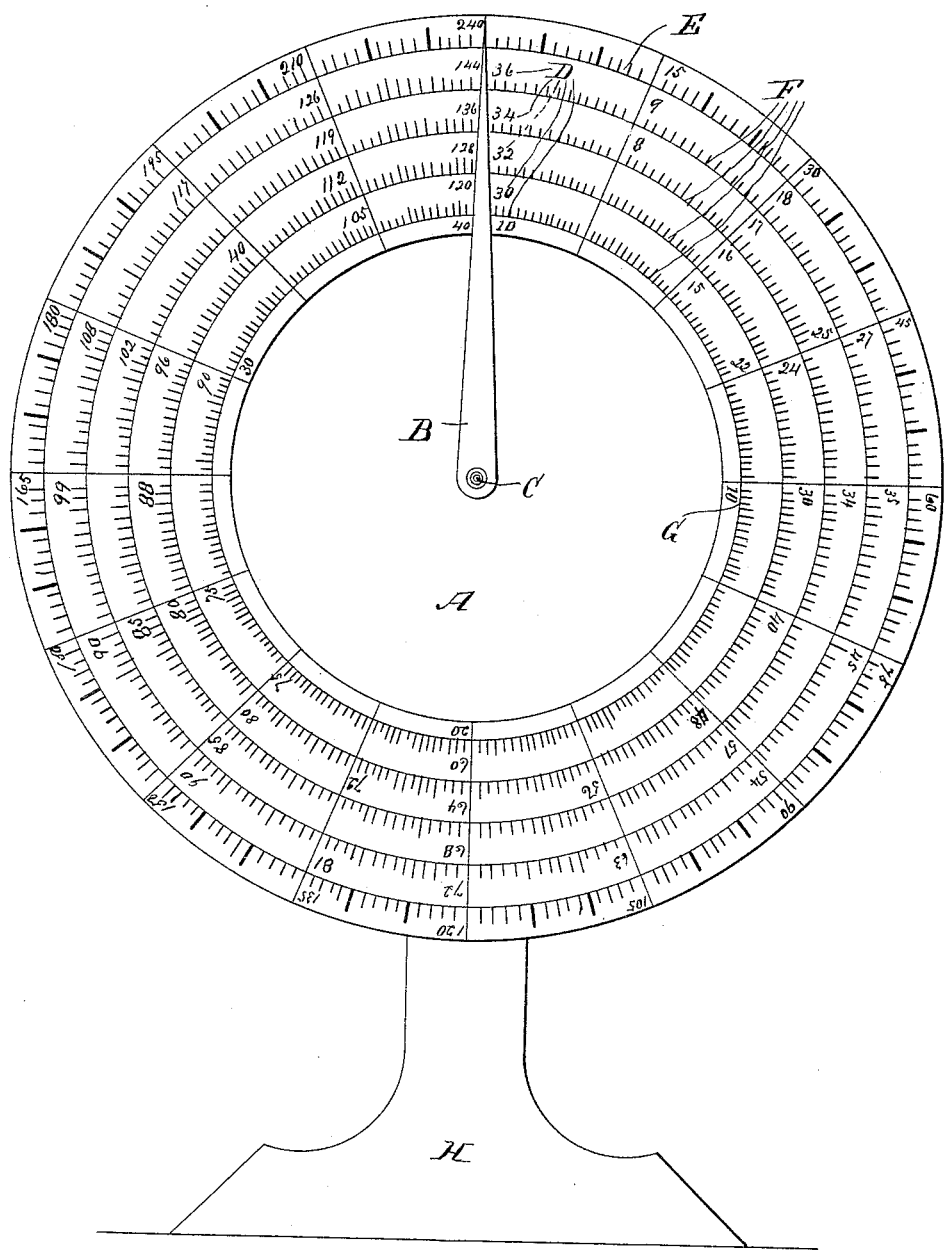
Witnesses:
C. T. Beer
Wm Mann
Inventor,
John K. Stewart.
By his Attorney
C. S. Campbell

United States Patent Office.

JOHN K. STEWART, OF WEST MANSFIELD, OHIO.

TOLL-REGISTER.

SPECIFICATION forming part of Letters Patent No. 384,938, dated June 19, 1888.

Application filed October 20, 1887. Serial No. 252,946. (No model.)

*To all whom it may concern:*

Be it known that I, JOHN K. STEWART, a citizen of the United States, and a resident of West Mansfield, in the county of Logan and State of Ohio, have invented a new and useful Improvement in Toll-Registers, of which the following is a specification.

My invention relates to improvements in automatic toll-registers for registering the proper amount of toll due out of any given amount of grain, or the amount of flour due at any rate of exchange from any amount of grain.

The figure is a front view.

A is my dial-plate; B, a hand or pointer thereon; C, the pivot of the hand; D, a column of figures showing rate of exchange.

E is the outside circle of figures, showing number of pounds of grain; F, the circles showing amount of flour due in exchange at the rate shown in column D opposite the figure; G, a circle showing amount of bran due; H, a base by which the dial may be attached to scales or other place.

My device is intended to be mounted on the grain-scales or flour-packer and to serve as a ready calculator or accountant of the number of pounds of flour to be given in exchange for any weight of grain at any given rate of exchange.

The construction and operation are as follows: Around the rim of the disk or dial A, I make a series of figures up to any number desired—in the case shown running up to 240. These figures are to indicate the number of pounds of grain to be exchanged. Inside this circle and concentric with it are a number of other circles gradually approaching the center. Each of these circles is spaced off, as shown in the drawing, and marked with dots, numbers, or dashes to represent, say, one pound each. Down the center of the dial, at the top, located in the various circles, is a column of figures representing the rate of exchange for any given circle. Thus, in the drawing I have shown in column D 36 as the figures opposite the first or outer circle of F, 34 opposite the next, 32 opposite the next, and 30 opposite the next, and so on, showing that this is the rate of exchange for those circles. In the center of the dial is pivoted a hand or pointer, B.

Now, let us say a farmer brings in a sack of wheat to be exchanged at thirty-six pounds of flour to the bushel of wheat. The miller throws it on the scales and finds that there are one hundred and five pounds of grain. The pointer B is then moved around to 105, when, by glancing down the side of the pointer, he finds there are due the farmer in exchange sixty-three pounds of flour. If the exchange were at a different rate, he has only to look alongside the pointer in the row or circle representing the rate of exchange, where it is shown at a glance the number of pounds due.

In the drawing no fractions of pounds are shown, as the divisions are scarcely ever made in exchange less than pounds. Fractions may be used when desired.

Beneath each circle of flour-exchange is a narrower circle, the figures in which represent the number of pounds of bran also due. These figures may be made of different color or design from those representing the flour.

My device can be readily attached to the weighing mechanism, so that the pointer will automatically show the number of pounds of grain as well as the amount of exchange to be given.

The dots, dashes, or marks used to represent pounds in the various circles of exchange are at even distances apart, the gradual contraction of the circles being so calculated as to bring the proper figure of exchange under the figure representing the corresponding amount of grain in the first or outer circle.

What I claim is—

The dial A, provided with circles E F G, marked with numerals, and the column D, also marked with numerals, in combination with the movable pointer B and the base H, whereby the whole may be attached to a weighing-scale or other object, as and for the purpose set forth.

JOHN K. STEWART.

Witnesses:
G. D. HARRINGTON,
L. B. McGEE.